US012701613B2

(12) United States Patent     (10) Patent No.: US 12,701,613 B2
Yu et al.     (45) Date of Patent: Aug. 4, 2026

(54) MECHANISM FOR SHARING CHANNEL OCCUPANCY TIME

(71) Applicant: Nokia Technologies Oy, Espoo (FI)

(72) Inventors: Ling Yu, Espoo (FI); Vinh Van Phan, Oulu (FI); Nuno Manuel Kiilerich Pratas, Aalborg (DK); Yong Liu, Shanghai (CN); Tao Tao, Shanghai (CN); Naizheng Zheng, Beijing (CN); Lianghai Ji, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 333 days.

(21) Appl. No.: 18/571,075

(22) PCT Filed: Jun. 22, 2021

(86) PCT No.: PCT/CN2021/101663
§ 371 (c)(1),
(2) Date: Dec. 15, 2023

(87) PCT Pub. No.: WO2022/266864
PCT Pub. Date: Dec. 29, 2022

(65) Prior Publication Data
US 2024/0306198 A1    Sep. 12, 2024

(51) Int. Cl.
*H04W 16/14*    (2009.01)
*H04W 74/0808*    (2024.01)
*H04W 92/18*    (2009.01)

(52) U.S. Cl.
CPC ....... *H04W 74/0808* (2013.01); *H04W 16/14* (2013.01); *H04W 92/18* (2013.01)

(58) Field of Classification Search
CPC .. H04W 92/18; H04W 16/14; H04W 74/0808
See application file for complete search history.

(56) References Cited

U.S. PATENT DOCUMENTS

| | | | |
|---|---|---|---|
| 12,376,085 B2 * | 7/2025 | Kusashima | ........... H04L 5/0064 |
| 2017/0238249 A1 * | 8/2017 | Yoon | .................. H04W 74/006 |
| | | | 370/311 |

(Continued)

FOREIGN PATENT DOCUMENTS

| | | |
|---|---|---|
| CN | 111107637 A | 5/2020 |
| CN | 111565475 A | 8/2020 |

(Continued)

OTHER PUBLICATIONS

Examiner's Decision of Final Rejection received for corresponding Japanese Patent Application No. 2023-578928, dated Jun. 24, 2025, 2 pages of Examiner's Decision of Final Rejection and 2 pages of translation available.

(Continued)

*Primary Examiner* — Dai Phuong
(74) *Attorney, Agent, or Firm* — SQUIRE PATTON BOGGS (US) LLP

(57) ABSTRACT

According to embodiments of the present disclosure, a first device determines one or more second devices to share a channel occupancy time (COT) for a sidelink transmission over an unlicensed spectrum bands. The first device transmits the information which indicates the COT to be shared by the first device and the one or more second devices. The second device determines a transmission gap within the COT and performs a LBT/CCA on the unlicensed spectrum bands based on the determined gap. In this way, it achieves sharing the COT among SL devices. It can improve spectrum efficiency and avoid resource waste.

15 Claims, 6 Drawing Sheets

(56)                    References Cited

U.S. PATENT DOCUMENTS

| | | | |
|---|---|---|---|
| 2018/0049143 | A1 | 2/2018 | Gupta et al. |
| 2020/0053798 | A1 | 2/2020 | Tsai et al. |
| 2020/0136714 | A1* | 4/2020 | Viorel .................... H04B 7/088 |
| 2020/0220693 | A1* | 7/2020 | Babaei .................. H04L 1/1812 |
| 2020/0404586 | A1* | 12/2020 | Zhang ............... H04W 52/0216 |
| 2021/0014892 | A1 | 1/2021 | Xue et al. |
| 2021/0084683 | A1* | 3/2021 | Li ..................... H04W 74/0808 |
| 2021/0092783 | A1* | 3/2021 | Sun ................... H04W 74/0875 |
| 2022/0039161 | A1 | 2/2022 | Zhang et al. |

FOREIGN PATENT DOCUMENTS

| | | | |
|---|---|---|---|
| CN | 111919483 | A | 11/2020 |
| CN | 112470505 | A | 3/2021 |
| CN | 112788607 | A | 5/2021 |
| CN | 112997570 | A | 6/2021 |
| JP | 2023-535732 | A | 8/2023 |
| JP | 2024-501983 | A | 1/2024 |
| WO | 2018/031269 | A1 | 2/2018 |
| WO | 2020/162804 | A1 | 8/2020 |
| WO | 2020/164439 | A1 | 8/2020 |
| WO | 2022/061754 | A1 | 3/2022 |
| WO | 2022/147310 | A1 | 7/2022 |

OTHER PUBLICATIONS

Office Action received for corresponding Chinese Patent Application No. 202180006291.3, dated Mar. 29, 2024, 12 pages of Office Action and no page of translation available.

Office Action received for corresponding Chinese Patent Application No. 202180006291.3, dated Aug. 29, 2024, 11 pages of Office Action and 9 pages of office action translation available.

Rejection Decision received for corresponding Chinese Patent Application No. 202180006291.3, dated Nov. 29, 2024, 12 pages of Rejection Decision and 9 pages of translation available.

Extended European Search Report received for corresponding European Patent Application No. 21946366.8, dated Feb. 12, 2025, 9 pages.

Office Action received for corresponding Japanese Patent Application No. 2023-578928, dated Feb. 25, 2025, 2 pages of Office Action and 5 pages of office action summary & translation available.

"3rd Generation Partnership Project; Technical Specification Group Radio Access Network; NR; Multiplexing and channel coding (Release 18)", 3GPP TS 38.212, V18.2.0, Mar. 2024, pp. 1-293.

"3rd Generation Partnership Project; Technical Specification Group Radio Access Network; Physical layer procedures for shared spectrum channel access (Release 18)", 3GPP TS 37.213, V18.2.0, Mar. 2024, pp. 1-49.

"3rd Generation Partnership Project; Technical Specification Group Radio Access Network; NR; NR and NG-RAN Overall Description; Stage 2 (Release 18)", 3GPP TS 38.300, V18.0.0, Dec. 2023, pp. 1-265.

"IEEE 802.11", Wikipedia, Retrieved on Dec. 1, 2023, Webpage available at : https://en.wikipedia.org/wiki/IEEE_802.11.

"3rd Generation Partnership Project, Technical Specification Group Radio Access Network; Physical layer procedures for shared spectrum channel access (Release 16)": 3GPP TS 37.213, V16.5.0, Mar. 2021, pp. 1-27.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.5.0, Mar. 2021, pp. 1-391.

"3rd Generation Partnership Project; Technical Specification Group Radio Access Network; NR; NR and NG-RAN Overall Description; Stage 2 (Release 16)", 3GPP TS 38.300, V16.5.0, Mar. 2021, pp. 1-151.

"3rd Generation Partnership Project; Technical Specification Group Radio Access Network; NR; Multiplexing and channel coding (Release 16)", 3GPP TS 38.212, V16.5.0, Mar. 2021, pp. 1-152.

International Search Report and Written Opinion received for corresponding Patent Cooperation Treaty Application No. PCT/CN2021/101663, dated Nov. 16, 2021, 9 pages.

"Proposals for using unlicensed spectrum for sidelink communication", 3GPP RAN TSG Meeting #91e, RP-210452. Agenda: 15, Lenovo, Mar. 16-26, 2021, pp. 1-3.

* cited by examiner

600

700

800

MECHANISM FOR SHARING CHANNEL OCCUPANCY TIME

RELATED APPLICATION

This application was originally filed as PCT Application No. PCT/CN2021/101663, filed on Jun. 22, 2021, which is incorporated herein by reference in its entirety.

FIELD

Embodiments of the present disclosure generally relate to the field of telecommunication and in particular, to methods, devices, apparatuses and computer readable storage medium for sharing channel occupancy time (COT).

BACKGROUND

With development of communication technologies, different communication scenarios have been proposed. For example, sidelink communication has been proposed. Sidelink is the special kind of communication mechanism between device and device without going through a network device. The technology of "sidelink" can be applied to various scenarios, for example, vehicle-to-vehicle (V2V), vehicle-to-everything (V2X) and the like. The device may generally perform a clear channel assessment (CCA) on an unlicensed spectrum band before on performing the sidelink communication on the unlicensed spectrum band, in order to determine that the unlicensed spectrum band is not occupied by other device(s). If the CCA is successful, the device can access the channel for a certain period of time which can be represented as "channel occupancy time (COT)."

SUMMARY

In general, example embodiments of the present disclosure provide a solution for sharing channel occupancy time.

In a first aspect, there is provided a first device. The first device comprises at least one processor; and at least one memory including computer program codes; the at least one memory and the computer program codes are configured to, with the at least one processor, cause the first device to: determine one or more second devices to share a channel occupancy time for a sidelink transmission over an unlicensed spectrum band; and transmit, at the first device, information indicating the channel occupancy time to be shared by the first device and the determined one or more second devices.

In a second aspect, there is provided a second device. The second device comprises at least one processor; and at least one memory including computer program codes; the at least one memory and the computer program codes are configured to, with the at least one processor, cause the second device to receive, from a first device, information indicating channel occupancy time to be shared by the first device and the second device; determine a transmission gap within the channel occupancy time based at least in part on sidelink transmissions from the first device; and perform a listen-before-talk on the unlicensed spectrum band based on the determined gap.

In a third aspect, there is provided a method. The method comprises determining, at a first device, one or more second devices to share a channel occupancy time for a sidelink transmission over an unlicensed spectrum band; and transmitting, at the first device, information indicating the channel occupancy time to be shared by the first device and the determined one or more second devices.

In a fourth aspect, there is provided a method. The method comprises receiving, at a second device and from a first device, information indicating channel occupancy time to be shared by the first device and the second device; determining a transmission gap within the channel occupancy time based at least in part on sidelink transmissions from the first device; and performing a listen-before-talk on the unlicensed spectrum band based on the determined gap.

In a fifth aspect, there is provided an apparatus. The apparatus comprise means for determining, at a first device, one or more second devices to share a channel occupancy time for a sidelink transmission over an unlicensed spectrum band; and means for transmitting, at the first device, information indicating the channel occupancy time to be shared by the first device and the determined one or more second devices.

In a sixth aspect, there is provided an apparatus. The apparatus comprises means for receiving, at a second device and from a first device, information indicating channel occupancy time to be shared by the first device and the second device; means for determining a transmission gap within the channel occupancy time based at least in part on sidelink transmissions from the first device; and means for performing a listen-before-talk on the unlicensed spectrum band based on the determined gap.

In a seventh aspect, there is provided a computer readable medium. The computer readable medium comprises program instructions for causing an apparatus to perform at least the method according to any one of the above fourth, fifth, or sixth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
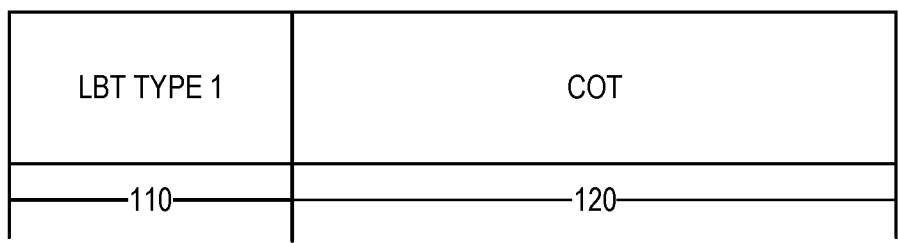
FIG. 1 illustrates a schematic diagram of a COT according to conventional technologies.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. The term "terminal device" refers to any end device that may be capable of wireless communication. In the following description, the terms "terminal device", "terminal", "user equipment" and "UE" may be used interchangeably.

As mentioned above, sidelink communication has been proposed. In sub-7 GHZ unlicensed bands, the NR coexistence with other systems is ensured via a listen-before-talk (LBT) channel access mechanism. Where, a UE intending to perform a sidelink transmission needs first to successfully complete an LBT check, before being able to initiate that same transmission.

For a UE to pass an LBT check it must observe the channel as available for a number of consecutive Clear Channel Assessment (CCA) slots. In sub-7 GHZ the duration of each of these slots is 9 μs. The UE deems the channel as available in a CCA slot if the measured power (i.e. the collected energy during the CCA slot) is below a regulatory specified threshold (which can depend on the operating band and geographical region). The term "listen-before-talk (LBT)" used herein refers to a technique used in radio communications whereby a radio transmitter first sense its radio environment before it starts a transmission. LBT can be used by a radio device to find a network the device is allowed to operate on or to find a free radio channel to operate on. For example, signal detection (SD) may be used in the LBT. A SD threshold can be sometimes referred to as the preamble carrier sense threshold. Only as an example, the SD threshold can be statistically around 4 dB signal-to-noise ratio (SNR) for most radios to detect and decode a preamble. In other words, a radio can usually decode any incoming preamble transmissions at a received signal at about 4 dB above the noise floor. Alternatively, energy detection may be used in the LBT.

The term "clear channel assessment (CCA)" used herein refers to a technique to appraise the RF medium. The CCA may involve listening for RF transmissions at the Physical layer radios use a CCA threshold when listening to the RF medium. For example, energy detection may be used in the CCA. The energy detect (ED) threshold is used to detect any other type of RF transmissions during the CCA. If energy detected on the channel is less than an energy detection threshold, the channel can be regarded as available for performing transmissions. If the energy detected on the channel is larger than an energy detection threshold, the channel can be regarded as busy.

When a UE initiates the communication (i.e. the UE takes the role of initiating device), then this UE has to acquire the "right" to access the channel for a certain period of time-denoted in the regulations as the Channel Occupancy Time (COT) (for example, the duration 120 shown in FIG. 1)—by applying an "extended" LBT procedure where the channel must be deemed as free for the entire duration of a Contention Window (CW) (shown as the duration 110 in FIG. 1). This "extended" LBT procedure, is commonly known as LBT type 1.

The duration of both the COT and CW depends on the Channel Access Priority Class (CAPC) associated with the UE's traffic, as shown in Table 1. Control plane traffic (such as PSCCH) is transmitted with p=1, while user plane traffic has p>1. In Table 1, it depicts the LBT Type 1 details for the Uu uplink (UL) case, but the downlink (DL) case LBT Type 1 parameters could also in principle be adopted in SL.

TABLE 1

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot,\ p}$ = 10 ms if the higher layer parameter absenceOfAnyOtherTechnology-r14 or absenceOfAnyOtherTechnology-r16 is provided, otherwise, $T_{ulm\ cot,p}$ = 6 ms.
NOTE 2:
When $T_{ulm\ cot,\ p}$ = 6 ms it may be increased to 8 ms by inserting one or more gaps. The minimum duration of a gap shall be 100 us. The maximum duration before including any such gap shall be 6 ms.
The contention window length in CCA slots associated with each CAPC has a minimum ($CW_{min,\ p}$) and maximum ($CW_{max,\ p}$). The duration of the COT is given by $T_{ulm\ cot,\ p}$.

Figure 2A:
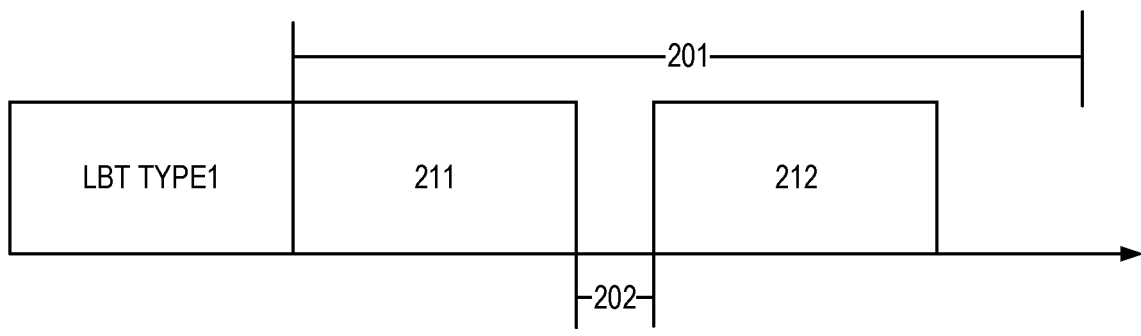
FIGS. 2A and 2B illustrate schematic diagrams of transmission gaps during the COT according to conventional technologies.
Figure 2B:
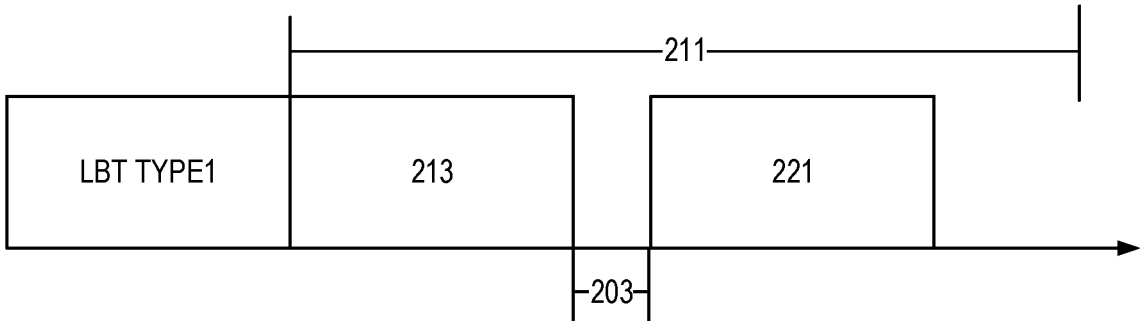

The UE initiating the transmission (which can be referred to "an initiating device") upon successfully completing the LBT Type 1, acquires the COT with duration associated with the corresponding CAPC and performs a transmission. For example, as shown in FIG. 2A, during the COT 201, the initiating device can perform the transmissions 211 and 212 and there is a gap 202 between the two transmissions. As shown in FIG. 2B, during the COT 211, the initiating device can perform the transmission 213 and the responding device can perform the transmission 221. There is also a gap 203 between the transmission 213 and the transmission 221. The acquired COT is valid even in the case where the initiating device pauses its transmission, although if the initiating device wants to perform a new transmission (within the COT) it is still required to perform a "reduced" LBT procedure.

This "reduced" LBT procedure, is commonly known as LBT Type 2, with the following variants:

Type 2A (25 µs LBT)—for SL transmissions within the initiating device acquired COT in case the gap between two SL transmissions (for example, the gap 202 and the gap 203 for SL transmissions following another SL transmission) is longer than or equal to 25 µs;

Type 2B (16 µs LBT)—for SL transmission within the initiating device acquired COT in case the gap between two SL transmissions (for example, the gap 202 and the gap 203) exactly equal to 16 µs;

Type 2C (no LBT)—for SL transmission within the initiating device acquired COT in case the gap between two SL transmissions (for example, the gap 202 and the gap 203) is shorter than or equal to 16 µs and the allowed duration of the SL transmission is less than or equal to 584 µs.

The initiating device can share its acquired COT with its intended receiver (the responding device). For this purpose, the initiating device shall inform (e.g. via control signaling) the responding device about the duration of this COT. The responding device uses this information to decide which type of LBT it should apply upon performing a transmission for which the intended receiver is the initiating device. In case the responding device transmission falls outside the COT, then the responding device will have to acquire a new COT using the LBT Type 1 with the appropriate channel access priority class (CAPC).

SL communications between UEs over PC5 are based on the principle of transmitter (Tx UE) oriented one-to-many broadcast. On one hand, Tx UE transmits SL to a Rx UE or a group of Rx UEs or all Rx UEs in proximity of Tx UE using resources from a (pre-)configured resource pool, at least for transmitting SL control information (SCI) which is used as a scheduling assignment for a SL data transmission. The term "TX UE" used herein can refer to a UE which can transmit data to another UE when performing sidelink communications with the other UE. The term "RX UE" used herein can refer to a UE which can receive data from another UE when performing sidelink communications with the other UE. On the other hand, Rx UE needs to keep monitoring over the (pre-)configured resource pool to receive SL, at least receiving all SCI instances and determining whether a received SCI and corresponding SL data transmission is meant for Rx UE to receive or not based on Source (SRC) and/or destination (DST) ID(s) indicated in the received SCI instances, SRC is corresponding to Tx side and DST is corresponding to Rx side. This is applied for all casting types over SL: unicast, groupcast or broadcast.

Conventionally, there are two modes of resource allocation, referred to as Mode 1 and Mode 2, specified for a SL transmission. Mode 1 is based on using scheduled resources or grants from a serving BS. This implies that Tx UE may need to be in radio resource control (RRC) CONNECTED state of the serving BS in order to get Mode 1 resources allocated. Mode 2 is based on autonomous allocation or selection of resources from a preconfigured Tx resource pool by Tx UE. The resource selection in Mode 2 can be based on a simple random selection or sensing-based selection. The latter is preferred and used for normal operation while the former is used for exceptional operations or situations with a particular, preconfigured resource pool. Mode 2 can be used for Tx UE being in coverage (IC) or out-of-coverage (OoC); in RRC IDLE, RRC INACTIVE or RRC CONNECTED state. Table 2 below specifies SCI which is used for scheduling a SL transmission and facilitating mode 2 sensing based resource allocation.

Table 2

---

8.3 Sidelink control information on PSCCH
SCI carried on PSCCH is a $1^{st}$-stage SCI, which transports sidelink scheduling information.
8.3.1 $1^{st}$-stage SCI formats
The fields defined in each of the $1^{st}$-stage SCI formats below are mapped to the information bits $a_0$ to $a_{A-1}$ as follows:
Each field is mapped in the order in which it appears in the description, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.
8.3.1.1 SCI format 1-A
SCI format 1-A is used for the scheduling of PSSCH and $2^{nd}$-stage-SCI on PSSCH
The following information is transmitted by means of the SCI format 1-A:
 Priority - 3 bits as specified in clause 5.4.3.3 of [12, TS 23.287] and clause 5.22.1.3.1 of [8, TS 38.321].

$$\text{Frequency resource assignment} - \left\lceil \log_2\left(\frac{N_{subChannel}^{SL}\left(N_{subChannel}^{SL}+1\right)}{2}\right)\right\rceil$$

bits when the value of the higher layer parameter sl-MaxNumPerReserve is configured to 2; otherwise log2(N subChannel SLN subChannel SL + 12N subChannel SL + 16) bits when the value of the higher layer parameter sl-MaxNumPerReserve is configured to 3, as defined in clause 8.1.2.2 of [6, TS 38.214].
 Time resource assignment - 5 bits when the value of the higher layer parameter sl-MaxNumPerReserve is configured to 2; otherwise 9 bits when the value of the higher layer parameter sl-MaxNumPerReserve is configured to 3, as defined in clause 8.1.2.1 of [6, TS 38.214].
 Resource reservation period - $\lceil\log_2 N_{rsv\_period}\rceil$ bits as defined in clause 8.1.4 of [6, TS 38.214], where $N_{rsv\_period}$ is the number of entries in the higher layer parameter sl-ResourceReservePeriodList, if higher layer parameter sl-MultiReserveResource is configured; 0 bit otherwise.
 DMRS pattern -$\lceil\log_2 N_{pattern}\rceil$ bits as defined in clause 8.4.1.1.2 of [4, TS 38.211], where $N_{pattern}$ is the number of DMRS patterns configured by higher layer parameter sl-PSSCH-DMRS-TimePatternList.
   $2^{nd}$-stage SCI format - 2 bits as defined in Table 8.3.1.1-1.
 Beta_offset indicator - 2 bits as provided by higher layer parameter sl-BetaOffsets2ndSCI and Table 8.3.1.1-2.
 Number of DMRS port - 1 bit as defined in Table 8.3.1.1-3.
 Modulation and coding scheme - 5 bits as defined in clause 8.1.3 of [6, TS 38.214].
 Additional MCS table indicator - as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.
 PSFCH overhead indication - 1 bit as defined clause 8.1.3.2 of [6, TS 38.214] if higher layer parameter sl-PSFCH-Period = 2 or 4; 0 bit otherwise.

-continued

---

Reserved - a number of bits as determined by higher layer parameter sl-NumReservedBits, with value set to zero.

---

For SL operated in unlicensed band, a SL UE can access the channel for the period of channel occupancy time (COT) after successful "extended" LBT procedure, i.e. LBT type 1. The acquired COT can be shared from the initiating device to the responding devices. The shared COT is valid even in the case where the relevant SL UEs pause their transmissions, but a "reduced" LBT procedure is required if the relevant SL UEs want to perform a new transmission after transmission pause within the COT. The term "channel occupancy time (COT)" used herein can refer to the total time for which eNB/gNB/UE and any eNB/gNB/UE(s) sharing the channel occupancy perform transmission(s) on a channel after an eNB/gNB/UE performs the corresponding channel access procedures described in this clause. For determining a Channel Occupancy Time, if a transmission gap is less than or equal to 25 μs, the gap duration is counted in the channel occupancy time. A channel occupancy time can be shared for transmission between an eNB/gNB/UE(s) and the corresponding eNB/gNB/UE(s).

In case of SL communication, either gNB scheduled mode 1 or sensing based mode 2 resource allocation allows frequency division multiplexing (FDM) among SL transmissions from different SL Tx UEs. Considering COT sharing for SL operated in unlicensed band, in principle all SL UEs can share the same COT without introducing interference among SL transmissions from different UEs due to mode 1 or mode 2 resource allocation designed in SL operation. However, utilizing COT sharing mechanism and defining the scope of COT sharing within different group of SL UEs, it becomes possible to manage the load balance between different SL bands in either licensed or unlicensed band. In addition, due to scheduled or sensing based SL resource allocation (mode 1 and mode 2), the SL transmission from different SL-U UEs may not interfere with each other. The identification of transmission pause/gap during COT as well as LBT measurement may not only take into account the SL-U UEs sharing the same COT but also other SL transmissions in the targeted unlicensed band to some extent.

In order to solve at least part of the above problems, a new solution on sharing COT is needed. According to embodiments of the present disclosure, a first device determines one or more second devices to share a COT for a sidelink transmission over an unlicensed spectrum bands. The first device transmits the information which indicates the COT to be shared by the first device and the one or more second devices. The second device determines a transmission gap within the COT and performs a LBT/CCA on the unlicensed spectrum bands based on the determined gap. In this way, it achieves sharing the COT among SL devices. It can improve spectrum efficiency and avoid resource waste.

Figure 3:
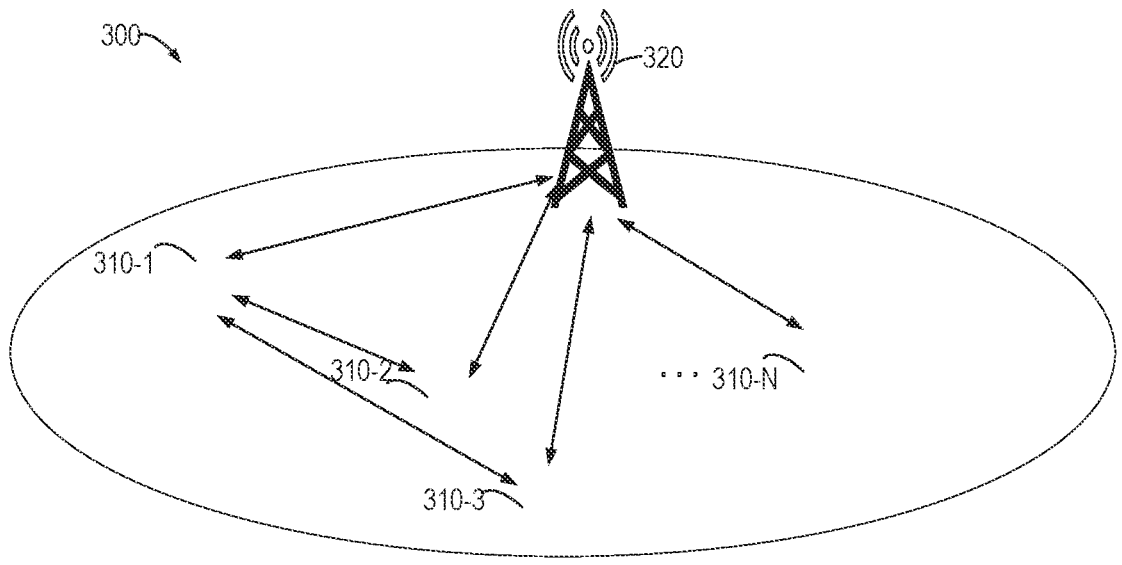
FIG. 3 illustrates an example communication environment in which example embodiments of the present disclosure can be implemented.

FIG. 3 illustrates a schematic diagram of a communication environment 300 in which embodiments of the present disclosure can be implemented. The communication environment 300, which is a part of a communication network, further comprises a terminal device 310-1, a terminal device 310-2, a terminal device 310-N, which can be collectively referred to as "terminal device(s) 310." The communication environment 300 comprises a network device 320. The number N can be any suitable integer numbers.

The communication environment 300 may comprise any suitable number of devices and cells. In the communication environment 300, the terminal device 310 and the network device 320 can communicate data and control information to each other. A link from the network device 320 to the terminal device 310 is referred to as a downlink (DL), while a link from the terminal device 310 to the network device 320 is referred to as an uplink (UL).

It is to be understood that the number of first devices and cells and their connections shown in FIG. 3 is given for the purpose of illustration without suggesting any limitations. The communication environment 300 may include any suitable number of devices and networks adapted for implementing embodiments of the present disclosure.

Communications in the communication environment 300 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 4:
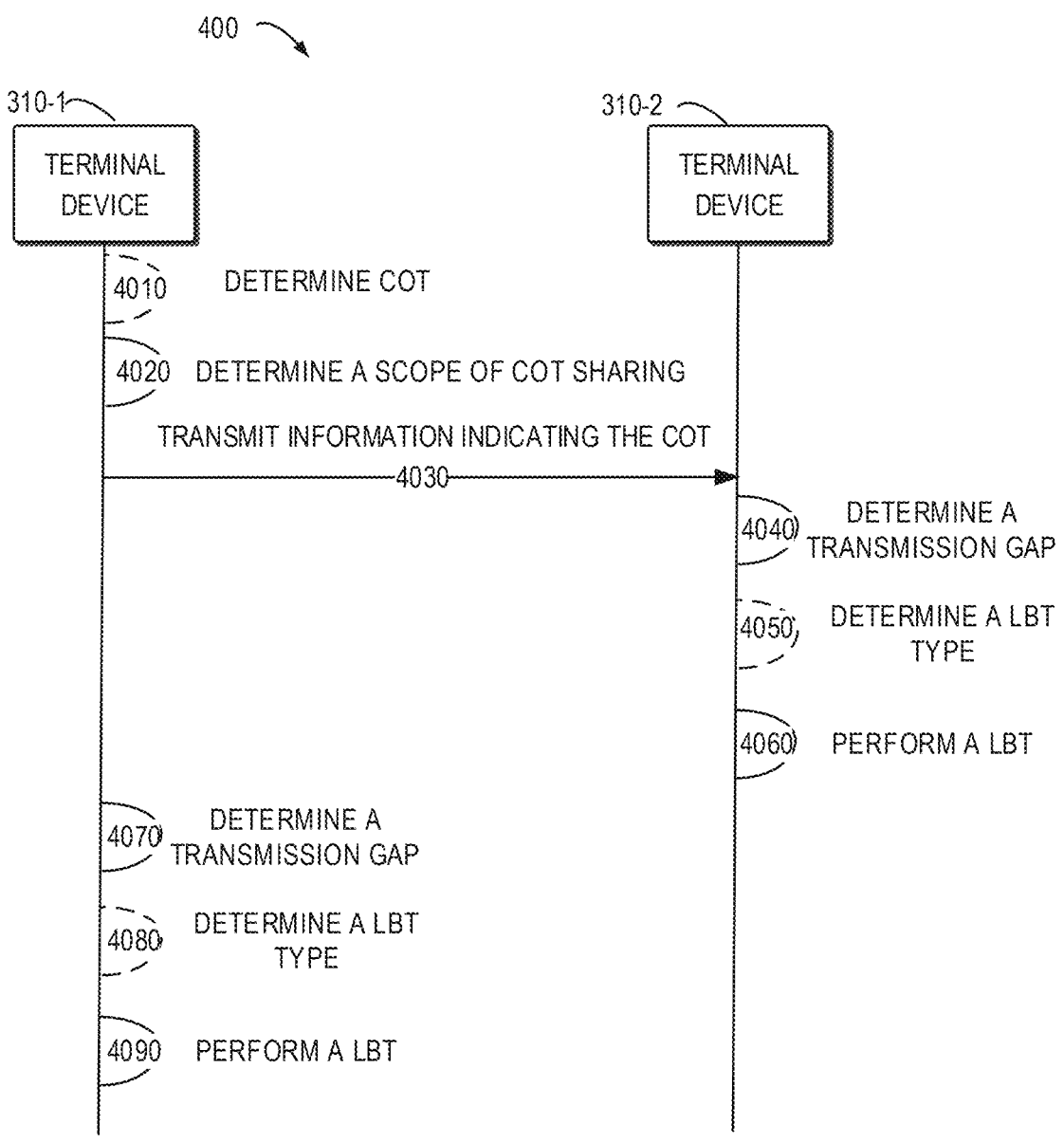
FIG. 4 illustrates a signaling flow for sharing COT according to some example embodiments of the present disclosure.

Example embodiments of the present disclosure will be described in detail below with reference to the accompanying drawings. Reference is now made to FIG. 4, which illustrates a signaling flow 400 for sharing COT according to example embodiments of the present disclosure. The signaling flow 400 may involve an initiating device (i.e., the first device) and a responding device (i.e., the second device). In some embodiments, the initiating device may be a terminal device (for example, the terminal device 310-1) and the responding device may be another terminal device (for example, the terminal device 310-2). Alternatively, the initiating device may be a network device (for example, the network device 320). In other embodiments, the initiating device may be sidelink unlicensed (SL-U) related devices such as a radio side unit (RSU) operated in an unlicensed spectrum band. The term "a shared spectrum band" or "an unlicensed spectrum band" can be used interchangeable. Embodiments of the present disclosure are not limited to this aspect. Only for the purpose of illustrations, the signaling flow 400 may involve the terminal device 310-1 and the terminal device 310-2. Only as an example, the terminal device 310-1 acts as the imitating device, and the terminal device 310-2 acts as the responding device. It should be noted that the terminal device 310-1 and the terminal device 310-2 are interchangeable. In other words, the terminal device 310-1 can be the responding device and the terminal device 310-2 can be the initiating device.

The terminal device 310-1 may determine 4010 a channel occupancy time (COT). In some embodiments, the terminal device 310-1 may acquire the COT using the LBT/CCA mechanism. For example, a conventional LBT mechanism may be used to obtain the COT. Alternatively, the LBT may take SL-U transmissions into account. For example, if the terminal device 310-1 has a SL operation capability (for example, SL-U UE or UE type RSU), it can monitor the SL-U transmissions and measure energy on the monitored SL-U transmission.

The terminal device 310-1 may determine a result of the LBT (or CCA) on the unlicensed spectrum band based on a difference between the energy of the sidelink transmission on the unlicensed spectrum band and a measured energy of the LBT (or CCA). For example, if the difference is within a threshold difference, the LBT may be considered as successfully to acquire the COT by the terminal device 310-1. In other words, if the energy detection in the LBT is similar as the calculated energy level of monitored SL-U transmission, the LBT may be considered as successfully to acquire the COT by COT initiating device. Alternatively, if the energy detection in the LBT is higher than the calculated energy level of monitored SL-U transmission beyond the configured threshold, the LBT may be considered as a failure.

The terminal device 310-1 determines 4020 a scope of COT sharing. In other words, the terminal device 310-1 determines 4020 one or more second/responding devices (for example, the terminal device 310-2 and/or the terminal device 310-3) to share the COT for the sidelink transmission over the unlicensed spectrum band. The term "scope of COT sharing" used herein can refer to whether the acquired COT is shared to all the SL-U UEs or to only part of SL-U UEs or a specific SL-U UE. In some embodiments, the terminal device 310-1 may determine the scope of COT sharing based on sensing results of SL operations in relevant SL bands. Alternatively or in addition, the scope of COT sharing can be determined based on LBT/CCA results in the unlicensed spectrum band of the acquired COT. In other embodiments, the terminal device 310-1 may determine the scope of COT based on type of services and/or quality of service (QOS) of SL communication that the terminal device 310-1 is involved in.

In some embodiments, the terminal device 310-1 can determine the one or more second/responding devices based on a congestion level (for example, channel busy ration measurements) on a further sidelink spectrum band associated with sidelink communications of the one or more second/responding devices. For example, the terminal device 310-1 may determine to share the COT to all SL-U UEs in proximity if the congestion level on the further sidelink spectrum band is higher than a configured threshold.

Alternatively or in addition, the terminal device 310-1 can determine the one or more second/responding devices based on the CCA/LBT result in the unlicensed spectrum band. In some embodiments, if the CCA/LBT result is better than a configured threshold and/or condition, the terminal device 310-1 may determine to share the COT to all SL-U UEs in proximity. For example, if a percentage of clear channel detected in the past N CCAs is higher than a predetermined percentage value, the terminal device 310-1 may determine to share the COT to all SL-U UEs in proximity. Otherwise, the terminal device 310-1 may determine to share the COT to only part of SL-UE or one specific SL-UE that has established SL groupcast or unicast communication with the terminal device 310-1. For another example, if energy detection (ED) measurement in past M CCAs is less than a predefined value, the terminal device 310-1 may determine to share the COT to all SL-UE in proximity. Otherwise, the terminal device 310-1 may determine to share the COT to only part of SL-UE or one specific SL-UE that has established SL groupcast or unicast communication with the terminal device 310-1.

In other embodiments, the terminal device 310-1 can determine the one or more second/responding devices based on the QoS of sidelink communication of the terminal device 310-1. For example, if the QoS of SL service is lower than a threshold, the terminal device 310-1 may determine to share the COT to all SL-U UEs in proximity. In some embodiments, the terminal device 310-1 may determine the one or more second/responding devices based on an expected reference signal received power (RSRP) measured by the one or more second/responding devices. Alternatively, the terminal device 310-1 can determine the one or more second/responding devices based on any combinations of the above conditions (for example, the congestion level, the CCA/LBT history result, QoS).

In an embodiment, the terminal device 310-1 may determine to share the COT to a targeted SL-U UEs in proximity, if the congestion measurement of the SL-U in the targeted unlicensed band is higher than a configured threshold. Alternatively, if the QoS of SL services in which the terminal device 310-1 is involved is higher than a configured threshold, the terminal device 310-1 may determine to share the COT to a targeted SL-U UEs in proximity. The terminal device 310-1 may determine to share the COT to a targeted SL-U UEs in proximity based on any combination of the above conditions (for example, the congestion level, QoS).

Alternatively or in addition, the terminal device 310-1 may determine the one or more second/responding devices based on an expected reference signal received power (RSRP) measured by the one or more second/responding devices. For example, the terminal device 310-1 may determine to share the acquired COT to SL-UEs within a region in its proximity, by indicating the RSRP threshold that a COT responding device should reach. In this embodiment, the terminal device 310-2 can measure the RSRP of the COT initiating transmission to determine whether the terminal device 310-2 is in the scope of the shared COT or not. In some embodiments, the indicated RSRP threshold can be based on the congestion (e.g. CBR measurements for intrasystem congestion and received signal strength indicator (RSSI) for inter-system congestion). For example for high congestion, the RSRP threshold is higher, while for lower congestion the RSRP threshold is lower; or the inverse, in case the acquired COT is to serve higher priority traffic.

As another example embodiment, the terminal device 310-1 may determine the one or more second/responding devices based on a logical relationship with the terminal device 310-1. The logical relationship with the terminal device 310-1 may include (be given by), for examples, whether the one or more second/responding devices communicate with the terminal device 310-1 over sidelink in a unicast, groupcast, or broadcast sidelink communication or not; or whether there is a common or shared sidelink function, service, or resource provided between the terminal device 310-1 and the one or more second/responding devices such as sidelink synchronization, sidelink control information, or resource pool.

The terminal device 310-1 transmits 4030 information to the terminal device 310-2. The information indicates the COT to be shared by the first device (i.e., the initiating device) and the determined one or more second devices (i.e., the responding device). In some embodiments, if the information is transmitted either using sidelink channel information (SCI) or an upper layer message (for example, medium access control (MAC) control element (CE) or RRC signaling), the COT sharing scope can be indicated using corresponding SL cast type. In some embodiments, if the terminal device 310-1 determines to share the COT to all SL-U UEs, the COT sharing information can be transmitted via SL broadcast. Alternatively or in addition, if the terminal device 310-1 determines to share the COT to the targeted SL-U UEs, the COT sharing information may be transmitted via SL groupcast or SL unicast. For example, if the COT is shared to a group of SL-U UEs, the information can be transmitted via the SL groupcast. Alternatively, if the COT is shared to one specific SL-U UE, the terminal device 310-1 may transmit the information via the SL unicast.

Alternatively, if the information is provided via physical signals (e.g. by pre-defined reference signals), the association between COT sharing scope and the corresponding physical signals should be configured to the relevant SL-U UEs. For instance, one physical signal may be configured for sharing COT to all SL-U UEs. The SL groupcast or unicast UEs may be configured with the specific physical signals for signaling COT sharing information either using configuration from network, from application or using PC-5 S or SL RRC configuration signaling. In addition, the other configuration parameters such as the different thresholds mentioned above may also be configured from network, from application or using PC5-S or SL RRC configuration signaling mechanism between the first device and the second device if both have SL capability.

The terminal device 310-2 determines 4040 a transmission gap within the channel occupancy time upon receiving COT sharing information from the terminal device 310-1. In some embodiments, the terminal device 310-2 can determine the transmission gap based on the sidelink transmissions from the determined one or more second devices. For instance, if COT is shared to all SL-U UEs, all the monitored SL transmissions on the unlicensed spectrum band should be taken into account when transmission gap is determined. If COT is shared to the targeted SL-U UE(s), the SL transmission using the shared COT should be taken into account for transmission gap calculation.

In some embodiments, to facilitate to identify the SL transmissions using shared COT, in one option, SL transmission using the shared COT may indicate an identity of the shared COT. In some embodiments, the identity of the shared COT may be an identifier of the terminal device 310-1, for example, source L1 or L2 ID of the terminal device 310-1. Alternatively, the identity of the shared COT may be indicated in 1st or 2nd stage of SCI of the SL-U transmission when the terminal device 310-1 sends COT sharing information.

In another embodiment, if the COT sharing information is transmitted using SL groupcast, the SL transmission targeted to the same SL groupcast (for example, identified by the same SL groupcast L2 ID) may be considered as the SL transmission using the shared COT and thus taken into account for transmission gap calculation.

In one embodiment, transmission gap can be determined by not only taking into account the SL transmission associated with the shared COT, but also taking into account other SL transmission in the targeted unlicensed spectrum band if the other SL transmission meets certain criteria. For example, the criteria may be defined by the RSRP (either RSRP of SL control channel PSCCH or SL data channel PSSCH) of monitored other SL transmissions. If the RSRP of other SL transmissions is higher than the configured threshold or higher than the RSRP of SL transmission from the initiating/responding device, the other SL transmission is taken into account when transmission gap is determined.

In another embodiment, the criteria may be defined by the location/distance of other SL transmission UEs. If the location/distance between transmission gap calculation UE and the other SL transmission UEs is within configured threshold or within the location/distance towards to COT initiating/responding device, the other SL transmission is taken into account when transmission gap is determined.

Figure 5:
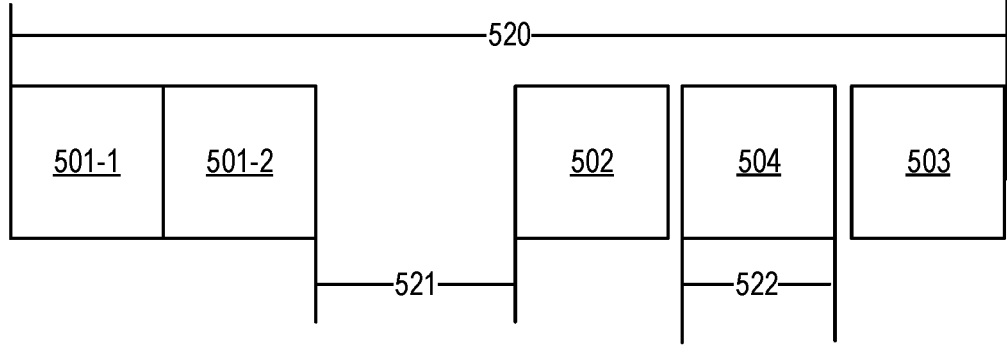
FIG. 5 illustrates a schematic diagram of gaps during the COT according to some example embodiments of the present disclosure.

FIG. 5 shows different types of gaps during the COT. As shown in FIG. 5, the terminal device 310-1 can perform the transmissions 501-1 and 501-2. The terminal device 310-2 can perform the transmission 502 and the terminal device 310-3 can perform the transmission 503 during the COT 520. The terminal device 310-2 and the terminal device 310-1 share the COT 520. The terminal device 310-1 and/or the terminal device 310-2 can determine the transmission gap 521 since there is no transmission. In some embodiments, if the terminal device 310-1 determines the transmission gap based on the sidelink transmissions from the determined one or more second devices, the terminal device 310-1 can determine the transmission gap 522. In other words, a terminal device which does not share the COT 520 can perform the transmission 504 within the COT 520 if it can acquire its own COT via successful LBT. If the terminal device 310-1 and/or the terminal device 310-2 only consider the sidelink transmissions associated with the COT 520, the gap 522 is determined. Alternatively, if other SL transmissions out of shared COT are considered for transmission gap calculation, the terminal device 310-1 may not determine the transmission gap 522 if the transmission 504 meets the configured criteria.

Referring back to FIG. 4, the terminal device 310-2 may determine 4050 a LBT type based on the transmission gap within the COT. If LBT is still needed (e.g, if detected transmission gap is larger than 16 or 25 µs) before SL transmission, the LBT results may be determined by taking into account SL transmissions according to resource reservation monitored from SCIs. In one embodiment, the initiating/responding device may determine the expected received energy from SL transmissions in the unlicensed spectrum band based on the resource reservation information monitored from received SCIs. If the measured energy for LBT is similar as the determined energy of SL transmissions in unlicensed spectrum band, the unlicensed band channel can be identified as un-occupied from LBT as the channel is occupied by other SL-U users instead of other unlicensed band users.

The terminal device 310-2 performs 4060 a LBT on the unlicensed spectrum band. The monitored SL-U transmission for the LBT may be based on 1st stage SCIs received by the SL-U UE that perform LBT or transmission gap calculation. Instead of or in addition to, it may be based on monitored DMRS of SL control and/or data transmission over PSCCH/PSSCH. The terminal device 310-2 may determine a result of the LBT (or CCA) on the unlicensed spectrum band based on a difference between the energy of the sidelink transmission on the unlicensed spectrum band and a measured energy of the LBT (or CCA). For example, if the difference is within a threshold difference, the LBT may be considered as successfully to acquire the COT by the terminal device 310-2. In other words, if the energy detection in the LBT is similar as the calculated energy level of monitored SL-U transmission, the LBT may be considered as successfully by the terminal device 310-2. Alternatively, if the energy detection in the LBT is higher than the calculated energy level of monitored SL-U transmission, the LBT may be considered as a failure.

In some embodiments, the terminal device 310-1 may determine 4070 a transmission gap if the terminal device 310-1 needs to transmit SL again within COT. The terminal device 310-1 can determine 4070 the transmission gap in a similar way as the terminal device 310-2 determining 4040 the transmission gap. The terminal device 310-1 may determine 4080 a LBT type, which is similar to the determination 4050. In some embodiments, the terminal device 310-1 may perform 4090 a LBT. It should be noted that the determination 4070 of the transmission gap, the determination 4080 of the LBT type and the performing 4090 of the LBT can be performed before or after the determination 4040 of the transmission gap, the determination 4050 of the LBT type and the performing 4060 of the LBT. Embodiments are not limited in this aspect.

Figure 6:
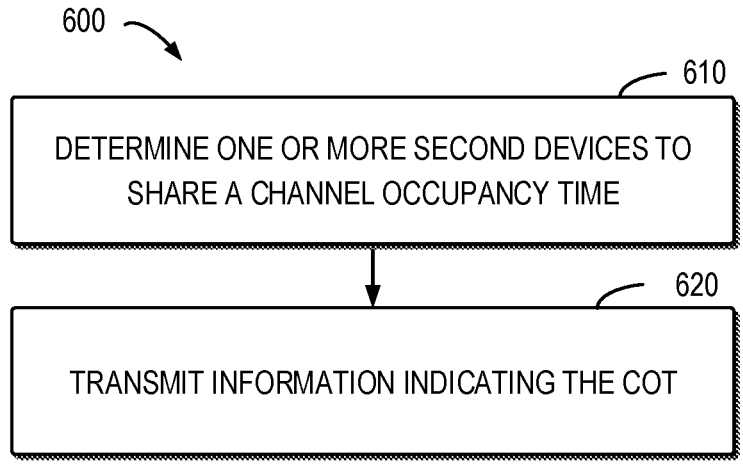
FIG. 6 illustrates a flowchart of a method implemented at a first apparatus according to some example embodiments of the present disclosure.

FIG. 6 shows a flowchart of an example method 600 in accordance with some example embodiments of the present disclosure. For the purpose of discussion, the method 600 will be described from the perspective of the initiating device. Only for the purpose of illustrations, the method 600 is described with the reference to the terminal device 310-1.

At block 610, the terminal device 310-1 determines one or more second devices to share a channel occupancy time for a sidelink transmission over an unlicensed spectrum band. In some embodiments, the terminal device 310-1 can determine the one or more second devices, in accordance with at least one of conditions: a congestion level on a further sidelink spectrum band associated with sidelink communication of one or more second devices, a clear channel assessment or listen-before-talk result in the unlicensed spectrum band, an expected reference signal received power measured by the one or more second devices, or a quality of service of sidelink communication of the terminal device 310-1.

Alternatively or in addition, the terminal device 310-1 may determine the one or more second/responding devices based on a logical relationship with the terminal device 310-1. The logical relationship with the terminal device 310-1 may include (be given by), for examples, whether the one or more second/responding devices communicate with the terminal device 310-1 over sidelink in a unicast, groupcast, or broadcast sidelink communication or not; or whether there is a common or shared sidelink function, service, or resource provided between the terminal device 310-1 and the one or more second/responding devices such as sidelink synchronization, sidelink control information, or resource pool.

At block 620, the terminal device 310-1 transmits information indicating the channel occupancy time to be shared by the first device and the determined one or more second devices.

In some embodiments, the terminal device 310-1 can determine a transmission gap within the channel occupancy time based at least on sidelink transmissions from the determined one or more second devices. The terminal device 310-1 may perform a listen-before-talk on the unlicensed spectrum band based on the determined gap.

In another embodiment, the terminal device 310-1 can transmit, to the one or more second devices, sidelink control information indicating an identity of the shared channel occupancy time. In this situation, if the sidelink transmissions indicating the identity of the shared channel occupancy time, the terminal device 310-1 can determine the transmission gap within the channel occupancy time based on the sidelink transmissions. Alternatively, the terminal device 310-1 can transmit the shared channel occupancy time information via a sidelink groupcast. If the sidelink transmissions are associated with the same sidelink groupcast, the terminal device 310-1 can determine the transmission gap within the channel occupancy time based on the sidelink transmissions.

In some embodiments, the terminal device 310-1 can perform a measurement on other sidelink transmissions from a third device which is different from the determined one or more second devices. In this case, if a measurement result on the other sidelink transmissions exceeds a threshold, the terminal device 310-1 can determine the transmission gap based on the sidelink transmissions and the other sidelink transmissions. The measurement on the other sidelink transmissions comprises at least one of: a measurement of reference signal received power of the other sidelink transmission from the third device; or a measurement of distance between the third device and the first device.

As another embodiment, the terminal device 310-1 can determine energy of sidelink transmissions on the sidelink on the unlicensed spectrum band. In this case, the terminal device 310-1 can determine result of a listen-before-talk on the unlicensed spectrum band in accordance with a difference between the energy and a measured energy of the listen-before-talk.

Figure 7:
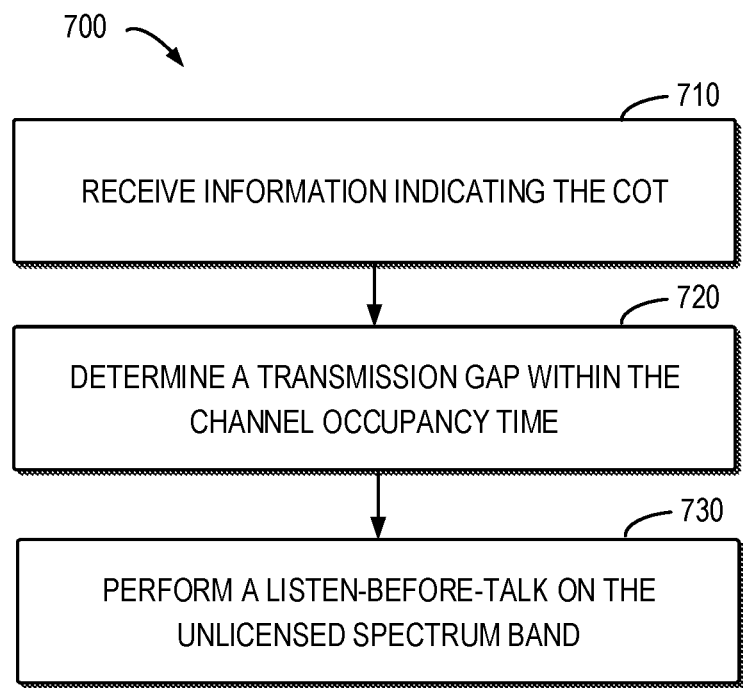
FIG. 7 illustrates a flowchart of a method implemented at a second apparatus according to some other example embodiments of the present disclosure.

FIG. 7 shows a flowchart of an example method 700 in accordance with some example embodiments of the present disclosure. For the purpose of discussion, the method 700 will be described from the perspective of the responding device. Only for the purpose of illustrations, the method 700 is described with the reference to the terminal device 310-2.

At block 710, the terminal device 310-2 receives, from a first device, information indicating channel occupancy time to be shared by the first device and the second device. The information can be transmitted via one of: SL broadcast, SL groupcast, or SL unicast.

At block 720, the terminal device 310-2 determines a transmission gap within the channel occupancy time based at least in part on sidelink transmissions from the first device. In some embodiments, the terminal device 310-2 can receive, from the first device, sidelink control information indicating an identity of the shared channel occupancy time. In this situation, if the sidelink transmissions indicating the identity of the shared channel occupancy time, the terminal device 310-2 can determine the transmission gap within the channel occupancy time based on the sidelink transmissions.

Alternatively, if information indicating channel occupancy time is received via a sidelink groupcast and the sidelink transmissions are associated with the same sidelink groupcast, the terminal device 310-2 can determine the transmission gap within the channel occupancy time based on the sidelink transmissions. In some embodiments, the terminal device 310-2 may perform a measurement on other sidelink transmissions from a third device which is different from the first device. In this situation, if a measurement result on the other sidelink transmissions exceeds a threshold, the terminal device 310-2 can determine the transmission gap based on the sidelink transmissions and the other sidelink transmissions. The measurement on the other sidelink transmissions comprises at least one of: a measurement of reference signal received power of the other sidelink transmission from the third device; or a measurement of distance between the third device and the second device.

At block 730, the terminal device 310-2 performs a listen-before-talk on the unlicensed spectrum band based on the determined gap. In some embodiments, the terminal device 310-2 can determine energy of sidelink transmissions on the sidelink on the unlicensed spectrum band. The terminal device 310-2 can determine result of a listenbefore-talk on the unlicensed spectrum band in accordance with a determination of a difference between the energy and a measured energy of the listen-before-talk.

In some example embodiments, a first apparatus capable of performing any of the method 600 (for example, the terminal device 310-1) may comprise means for performing the respective operations of the method 600. The means may be implemented in any suitable form. For example, the means may be implemented in a circuitry or software module. The first apparatus may be implemented as or included in the terminal device 310-1. In some example embodiments, the means may comprise at least one processor and at least one memory including computer program code. The at least one memory and computer program code are configured to, with the at least one processor, cause performance of the apparatus.

In some embodiments, the first device comprises means for determining one or more second devices to share a channel occupancy time for a sidelink transmission over an unlicensed spectrum band; and means for transmitting, at the first device, information indicating the channel occupancy time to be shared by the first device and the determined one or more second devices.

In some embodiments, the means for determining the one or more second devices comprises: means for determining the one or more second devices, in accordance with at least one of conditions: a congestion level on a further sidelink spectrum band associated with sidelink communication of one or more second devices, a clear channel assessment or listen-before-talk result in the unlicensed spectrum band, an expected reference signal received power measured by the one or more second devices, a quality of service of sidelink communication of the first device, or a logical relationship with the first device.

In some embodiments, the first device comprises means for determining a transmission gap within the channel occupancy time based at least on sidelink transmissions from the determined one or more second devices; and means for performing a listen-before-talk on the unlicensed spectrum band based on the determined gap.

In some embodiments, the first device comprises means for transmitting, to the one or more second devices, sidelink control information indicating an identity of the shared channel occupancy time; and the means for determining the transmission gap within the channel occupancy time comprises: means for in accordance with a determination that the sidelink transmissions indicating the identity of the shared channel occupancy time, determining the transmission gap within the channel occupancy time based on the sidelink transmissions.

In some embodiments, the means for transmitting the information indicating channel occupancy time to be shared by one or more second devices comprises: means for transmitting the information via a sidelink groupcast; and the means for determining the transmission gap within the channel occupancy time comprises: means for in accordance with a determination that the sidelink transmissions are associated with the sidelink groupcast, determining the transmission gap within the channel occupancy time based on the sidelink transmissions.

In some embodiments, the first device comprises means for performing a measurement on other sidelink transmissions from a third device which is different from w the determined one or more second devices; the means for determining the transmission gap within the channel occupancy time comprises: means for in accordance with a determination that a measurement result on the other sidelink transmissions exceeds a threshold, determining the transmission gap based on the sidelink transmissions and the other sidelink transmissions.

In some embodiments, the measurement on the other sidelink transmissions comprises at least one of: a measurement of reference signal received power of the other sidelink transmission from the third device; or a measurement of distance between the third device and the first device.

In some embodiments, the first device comprises means for determining energy of sidelink transmissions on the sidelink on the unlicensed spectrum band; and means for determining result of a listen-before-talk on the unlicensed spectrum band in accordance with a difference between the energy and a measured energy of the listen-before-talk.

In some embodiments, the first device is a terminal device or a network device, and the second device is another terminal device or another network device.

In some example embodiments, a first apparatus capable of performing any of the method 700 (for example, the terminal device 310-2) may comprise means for performing the respective operations of the method 700. The means may be implemented in any suitable form. For example, the means may be implemented in a circuitry or software module. The first apparatus may be implemented as or included in the terminal device 310-2. In some example embodiments, the means may comprise at least one processor and at least one memory including computer program code. The at least one memory and computer program code are configured to, with the at least one processor, cause performance of the apparatus.

In some embodiments, the second device comprises means for receiving, at a second device and from a first device, information indicating channel occupancy time to be shared by the first device and the second device; means for determining a transmission gap within the channel occupancy time based at least in part on sidelink transmissions from the first device; and means for performing a listen-before-talk on the unlicensed spectrum band based on the determined gap.

In some embodiments, the second device comprises means for receiving, from the first device, sidelink control information indicating an identity of the shared channel occupancy time; and the means for determining the transmission gap within the channel occupancy time comprises: means for in accordance with a determination that the sidelink transmissions indicating the identity of the shared channel occupancy time, determining the transmission gap within the channel occupancy time based on the sidelink transmissions.

In some embodiments, the means for receiving the information indicating channel occupancy time to be shared by one or more second devices comprises: means for receiving the information via a sidelink groupcast; and the means for determining the transmission gap within the channel occupancy time comprises: means for in accordance with a determination that the sidelink transmissions are associated with the sidelink groupcast, determining the transmission gap within the channel occupancy time based on the sidelink transmissions.

In some embodiments, the second device comprises means for performing a measurement on other sidelink transmissions from a third device which is different from the first device; the means for determining the transmission gap within the channel occupancy time comprises: in accordance with a determination that a measurement result on the other sidelink transmissions exceeds a threshold, determining the transmission gap based on the sidelink transmissions and the other sidelink transmissions.

In some embodiments, the measurement on the other sidelink transmissions comprises at least one of: a measurement of reference signal received power of the other sidelink transmission from the third device; or a measurement of distance between the third device and the second device.

In some embodiments, the second device comprises means for determining energy of sidelink transmissions on the sidelink on the unlicensed spectrum band; and means for determining result of a listen-before-talk on the unlicensed spectrum band in accordance with a determination of a difference between the energy and a measured energy of the listen-before-talk.

In some embodiments, the first device is a terminal device or a network device, and the second device is another terminal device or another network device.

Figure 8:
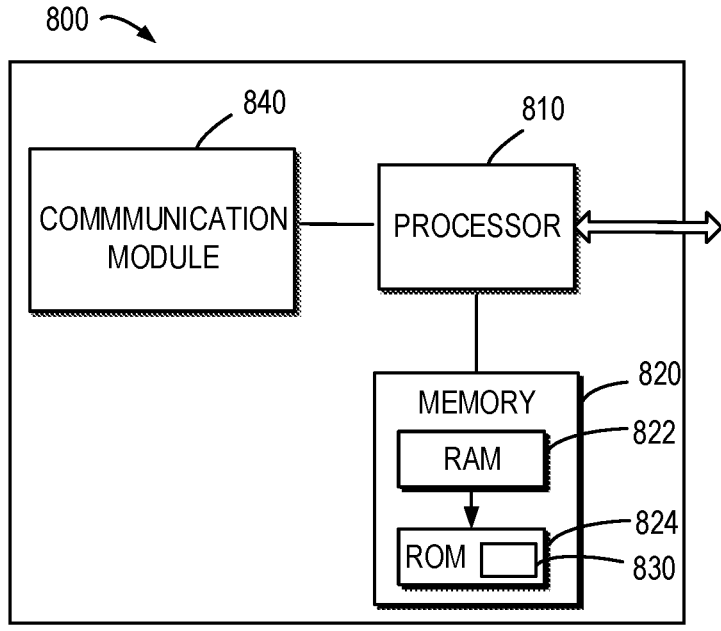
FIG. 8 illustrates a simplified block diagram of an apparatus that is suitable for implementing example embodiments of the present disclosure.

FIG. 8 is a simplified block diagram of a device 800 that is suitable for implementing example embodiments of the present disclosure. The device 800 may be provided to implement a communication device, for example, the terminal device 310 or the network device 320 as shown in FIG. 3. As shown, the device 800 includes one or more processors 810, one or more memories 820 coupled to the processor 810, and one or more communication modules 840 coupled to the processor 810.

The communication module 840 is for bidirectional communications. The communication module 840 has one or more communication interfaces to facilitate communication with one or more other modules or devices. The communication interfaces may represent any interface that is necessary for communication with other network elements. In some example embodiments, the communication module 840 may include at least one antenna.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 822 and other volatile memories that will not latest in the power-down duration.

A computer program 830 includes computer executable instructions that are executed by the associated processor 810. The program 830 may be stored in the memory, e.g., ROM 824. The processor 810 may perform any suitable actions and processing by loading the program 830 into the RAM 822.

Example embodiments of the present disclosure may be implemented by means of the program 830 so that the device 800 may perform any process of the disclosure as discussed with reference to FIGS. 4 to 7. The example embodiments of the present disclosure may also be implemented by hardware or by a combination of software and hardware.

Figure 9:
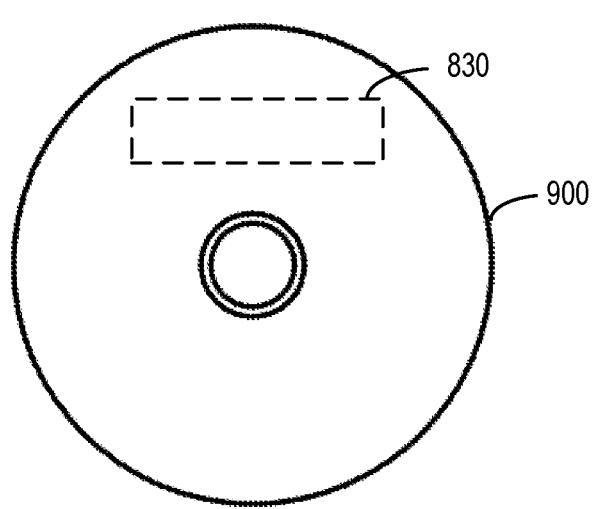
FIG. 9 illustrates a block diagram of an example computer readable medium in accordance with some example embodiments of the present disclosure.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and other magnetic storage and/or optical storage. FIG. 9 shows an example of the computer readable medium 900 in form of an optical storage disk. The computer readable medium has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 4 to 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:

at least one processor; and at least one memory storing instructions that, when executed by the at least one processor, cause the first device at least to perform:

determining one or more second devices to share a channel occupancy time for a sidelink transmission over an unlicensed spectrum band;

transmitting information indicating the channel occupancy time to be shared by the first device and the determined one or more second devices;

determining a transmission gap within the channel occupancy time based at least on sidelink transmissions from the determined one or more second devices, wherein determining the transmission gap within the channel occupancy time comprises:

in accordance with a determination that the sidelink control information indicating an identity of the shared channel occupancy time, determining the transmission gap within the channel occupancy time based on the sidelink transmissions;

performing a listen-before-talk on the unlicensed spectrum band based on the determined gap; and transmitting, to the one or more second devices, sidelink control information indicating the identity of the shared channel occupancy time, wherein the identity of the shared channel occupancy time comprises an identity of the first device, and wherein the sidelink control information is transmitted via sidelink in an unlicensed spectrum (SL-U) transmission.

2. The first device of claim 1, wherein determining the one or more second devices comprises:

determining the one or more second devices, in accordance with at least one of conditions:

a congestion level on a further sidelink spectrum band associated with sidelink communication of one or more second devices, a clear channel assessment or listen-before-talk result in the unlicensed spectrum band, an expected reference signal received power measured by the one or more second devices, a quality of service of sidelink communication of the first device, or a logical relationship with the first device.

3. The first device of claim 1, wherein transmitting the information indicating channel occupancy time to be shared by one or more second devices comprises:

transmitting the information via a sidelink groupcast; and wherein determining the transmission gap within the channel occupancy time comprises:

in accordance with a determination that the sidelink transmissions are associated with the sidelink groupcast, determining the transmission gap within the channel occupancy time based on the sidelink transmissions.

4. The first device of claim 1, wherein the first device is further caused to perform:

performing a measurement on other sidelink transmissions from a third device which is different from the determined one or more second devices;

wherein determining the transmission gap within the channel occupancy time comprises:

in accordance with a determination that a measurement result on the other sidelink transmissions exceeds a threshold, determining the transmission gap based on the sidelink transmissions and the other sidelink transmissions.

5. The first device of claim 4, wherein the measurement on the other sidelink transmissions comprises at least one of:

a measurement of reference signal received power of the other sidelink transmission from the third device; or a measurement of distance between the third device and the first device.

6. The first device of claim 1, the first device is further caused to perform:

determining energy of sidelink transmissions on the sidelink on the unlicensed spectrum band; and determining result of a listen-before-talk on the unlicensed spectrum band in accordance with a difference between the energy and a measured energy of the listen-before-talk.

7. The first device of claim 1, wherein the first device is a terminal device or a network device, and the second device is another terminal device or another network device.

8. A second device comprising:

at least one processor; and at least one memory storing instructions that, when executed by the at least one processor, cause the second device at least to perform:

receiving, at a second device and from a first device, information indicating channel occupancy time to be shared by the first device and the second device;

determining a transmission gap within the channel occupancy time based at least in part on sidelink transmissions from the first device, wherein determining the transmission gap within the channel occupancy time comprises:

in accordance with a determination that the sidelink control information indicating the identity of the shared channel occupancy time, determining the transmission gap within the channel occupancy time based on the sidelink transmissions;

performing a listen-before-talk on the unlicensed spectrum band based on the determined transmission gap; and receiving, from the first device, sidelink control information indicating an identity of the shared channel occupancy time, wherein the identity of the shared channel occupancy time comprises an identity of the first device, and wherein the sidelink control information is transmitted via sidelink in an unlicensed spectrum (SL-U) transmission.

9. The second device of claim 8, wherein receiving the information indicating channel occupancy time to be shared by one or more second devices comprises:

receiving the information via a sidelink groupcast; and wherein determining the transmission gap within the channel occupancy time comprises:

in accordance with a determination that the sidelink transmissions are associated with the sidelink groupcast, determining the transmission gap within the channel occupancy time based on the sidelink transmissions.

10. The second device of claim 8, wherein the second device is further caused to perform:

performing a measurement on other sidelink transmissions from a third device which is different from the first device;

wherein determining the transmission gap within the channel occupancy time comprises:

in accordance with a determination that a measurement result on the other sidelink transmissions exceeds a threshold, determining the transmission gap based on the sidelink transmissions and the other sidelink transmissions.

11. The second device of claim 10, wherein the measurement on the other sidelink transmissions comprises at least one of:

a measurement of reference signal received power of the other sidelink transmission from the third device; or a measurement of distance between the third device and the second device.

12. The second device of claim 8, wherein the second device is further caused to perform:

determining energy of sidelink transmissions on the sidelink on the unlicensed spectrum band; and determining result of a listen-before-talk on the unlicensed spectrum band in accordance with a determination of a difference between the energy and a measured energy of the listen-before-talk.

13. The second device of claim 8, wherein the first device is a terminal device or a network device, and the second device is another terminal device or another network device.

14. A method, comprising:

determining, at a first device, one or more second devices to share a channel occupancy time for a sidelink transmission over an unlicensed spectrum band;

transmitting, at the first device, information indicating the channel occupancy time to be shared by the first device and the determined one or more second devices;

determining a transmission gap within the channel occupancy time based at least on sidelink transmissions from the determined one or more second devices, wherein determining the transmission gap within the channel occupancy time comprises:

in accordance with a determination that the sidelink control information indicating an identity of the shared channel occupancy time, determining the transmission gap within the channel occupancy time based on the sidelink transmissions;

performing a listen-before-talk on the unlicensed spectrum band based on the determined gap; and transmitting, to the one or more second devices, sidelink control information indicating the identity of the shared channel occupancy time, wherein the identity of the shared channel occupancy time comprises an identity of the first device, and wherein the sidelink control information is transmitted via sidelink in an unlicensed spectrum (SL-U) transmission.

15. The method of claim 14, wherein transmitting the information indicating channel occupancy time to be shared by one or more second devices comprises:

transmitting the information via a sidelink groupcast; and wherein determining the transmission gap within the channel occupancy time comprises:

in accordance with a determination that the sidelink transmissions are associated with the sidelink groupcast, determining the transmission gap within the channel occupancy time based on the sidelink transmissions.

* * * * *